(12) United States Patent
Sivanthi et al.

(10) Patent No.: US 10,574,480 B2
(45) Date of Patent: Feb. 25, 2020

(54) TUNNELLING TIME-CRITICAL MESSAGES BETWEEN SUBSTATIONS OVER WAN

(71) Applicant: ABB Schweiz AG, Baden (CH)

(72) Inventors: Thanikesavan Sivanthi, Birmenstorf (CH); Theo Widmer, Birmenstorf (CH); Dominique Cachin, Winterthur (CH); Christian Leeb, Zürich (CH); Hans-Joerg Maag, Zürich (CH); Gargi Bag, Västeras (SE); Johan Palm, Eskilstun (SE); Linus Thryborn, Västeras (SE)

(73) Assignee: ABB Schweiz AG, Baden (CH)

( * ) Notice: Subject to any disclaimer, the term of this patent is extended or adjusted under 35 U.S.C. 154(b) by 305 days.

(21) Appl. No.: 15/257,502

(22) Filed: Sep. 6, 2016

(65) Prior Publication Data
US 2016/0373274 A1   Dec. 22, 2016

Related U.S. Application Data

(63) Continuation of application No. PCT/EP2015/052498, filed on Feb. 6, 2015.

(30) Foreign Application Priority Data

Mar. 6, 2014 (EP) .................................. 14158205

(51) Int. Cl.
*H04L 12/46* (2006.01)
*H04L 12/723* (2013.01)
*H04L 29/08* (2006.01)

(52) U.S. Cl.
CPC .......... *H04L 12/4633* (2013.01); *H04L 45/50* (2013.01); *H04L 69/324* (2013.01); *H04L 2212/00* (2013.01)

(58) Field of Classification Search
CPC .. G05B 15/02; G05F 1/66; H04B 3/54; H04L 12/10; H04L 12/1886; H04L 12/2807;
(Continued)

(56) References Cited

U.S. PATENT DOCUMENTS 8,037,173 B2 * 10/2011 Tuckey .............. G05B 23/0224
709/224
8,363,659 B2 * 1/2013 Wimmer .................. H04L 41/08
370/395.53
(Continued)

FOREIGN PATENT DOCUMENTS

CN   102664776 A   9/2012
EP     2608456 A1   6/2013
(Continued)

OTHER PUBLICATIONS

RFC3985 titled "Pseudo Wire Emulation Edge-to-Edge (PWE3) Architecture" (RFC3985 hereinafter) was presented as Network Working Group Request for Comments: 3985 in the Category: Informational published Mar. 2005.*
(Continued)

*Primary Examiner* — Zhiren Qin
(74) *Attorney, Agent, or Firm* — Taft Stettinius & Hollister LLP; J. Bruce Schelkopf (57) ABSTRACT

A method includes transmitting time-critical messages in an OSI layer 2 network tunnel from a first IED in a first substation to a second IED in a second substation over a WAN, wherein each of the first and second substation comprises an edge IED and is associated with a substation LAN, wherein each of the time-critical messages comprises message parameters. The method includes: creating a translation table comprising corresponding values of the message parameters, between the LANs and the WAN; defining a virtual IED in the second substation using the translated values of the message parameters, to impersonate the first
(Continued)

IED; translating the message parameters according to the translation table, by the edge IED of the first and second substation; forwarding the time-critical messages from the first IED in the first substation to the WAN; and receiving the time-critical messages by the second IED in the second substation from the WAN.

20 Claims, 10 Drawing Sheets

(58) Field of Classification Search
CPC ... H04L 12/462; H04L 12/4641; H04L 67/12; H04L 41/08; H04L 41/0843; H04L 41/0879; H04L 41/0886; H04L 69/22; H04L 12/4645; H04L 12/4633; H04L 69/324; H04W 4/06; H04W 88/16; H02H 7/261; H02J 13/0013; Y02B 70/325; Y02E 60/723; Y02E 60/724; Y02E 60/725; Y04S 10/16; Y04S 10/18; Y04S 10/20; Y04S 20/228
See application file for complete search history.

(56) References Cited

U.S. PATENT DOCUMENTS

| | | | | |
|---|---|---|---|---|
| 8,392,557 | B2* | 3/2013 | Hilpert | H04L 41/145 |
| | | | | 709/224 |
| 8,649,131 | B2* | 2/2014 | Su | H02H 7/261 |
| | | | | 361/38 |
| 8,675,654 | B2* | 3/2014 | Taft | H04L 12/1836 |
| | | | | 370/390 |
| 8,739,178 | B2* | 5/2014 | Bosold | H04L 67/025 |
| | | | | 700/286 |
| 8,804,547 | B2* | 8/2014 | Wimmer | H04L 41/0853 |
| | | | | 370/252 |
| 8,880,658 | B2* | 11/2014 | Kulathu | H04L 67/125 |
| | | | | 709/220 |
| 8,908,342 | B2* | 12/2014 | Smit | H02H 7/261 |
| | | | | 361/62 |
| 8,923,993 | B2* | 12/2014 | Kulathu | G05B 19/0426 |
| | | | | 700/286 |
| 9,021,067 | B2* | 4/2015 | Wimmer | G06F 15/177 |
| | | | | 709/220 |
| 9,112,710 | B2* | 8/2015 | Taft | H04L 12/1836 |
| 9,160,552 | B2* | 10/2015 | Taft | H04L 12/1836 |
| 9,634,850 | B2* | 4/2017 | Taft | H04L 12/1836 |
| 2010/0039954 | A1* | 2/2010 | Wimmer | H04L 41/0853 |
| | | | | 370/252 |
| 2010/0040068 | A1* | 2/2010 | Wimmer | H04L 41/08 |
| | | | | 370/395.53 |
| 2013/0117421 | A1* | 5/2013 | Wimmer | G06F 15/177 |
| | | | | 709/220 |
| 2014/0269736 | A1* | 9/2014 | Kasztenny | H04L 45/30 |
| | | | | 370/400 |
| 2016/0285872 | A1* | 9/2016 | Polar | H04L 51/36 |

FOREIGN PATENT DOCUMENTS

| | | |
|---|---|---|
| EP | 2688251 A1 | 1/2014 |
| WO | 2013127078 A1 | 9/2013 |

OTHER PUBLICATIONS

ALCATEL titled "Transforming Critical Communications Networks for Substation Automation" (ALCATEL hereinafter) was presented in a White Paper having a published date of Jan. 2014. (Year: 2014).*

International Search Report and Written Opinion, PCT/EP2015/052498, dated Apr. 16, 2015, ABB Technology AG, 10 pages.

European Search Report, EP14158205, dated May 21, 2014, ABB Technology AG, 7 pages.

Leischner, et al., Security Through VLAN Segmentation: Isolating and Securing Critical Assets Without Loss of Usability, Proceedings of the 9th Annual Western Power Delivery and Automation Conference, Apr. 1, 2007, 7 pages.

National Intellectual Property Administration, P.R. China; Translation of First Chinese Office Action dated Nov. 16, 2018; Chinese Application No. 201580012346.6; Applicant: ABB Schweiz AG; 4 pgs.

National Intellectual Property Administration, P. R. China; Translation of Search Report dated Nov. 8, 2018; Chinese Application No. 201580012346.6; Applicant: ABB Schweiz AG; 2 pgs.

* cited by examiner

```
Frame 1: 159 bytes on wire (1272 bits), 159 bytes captured (1272 bits)
Ethernet II, Src: Ge_08:2f:77 (00:a0:f4:08:2f:77), Dst: Ge_08:2f:77 (01:a0:f4:08:2f:77)
  Destination: Ge_08:2f:77 (01:a0:f4:08:2f:77)
  Source: Ge_08:2f:77 (00:a0:f4:08:2f:77)
  Type: IEC 61850/GOOSE (0x88b8)
GOOSE
  APPID: 0x0001 (1)
  Length: 145
  Reserved 1: 0x0000 (0)
  Reserved 2: 0x0000 (0)
  goosePdu
    gocbRef: GEDeviceF650/LLN0$GO$gcb01
    timeAllowedtoLive: 40000
    datSet: GEDeviceF650/LLN0$GOOSE1
    goID: F650_GOOSE1
    t: Jan 2, 2000 02:46:11.258165836 UTC
    stNum: 1
    sqNum: 10
    test: False
    confRev: 1
    ndsCom: False
    numDatSetEntries: 8
    allData: 8 items
      Data: boolean (3)
      Data: bit-string (4)
      Data: boolean (3)
      Data: bit-string (4)
      Data: boolean (3)
      Data: bit-string (4)
      Data: boolean (3)
      Data: bit-string (4)
```

Fig. 1

Communication section

```xml
<ConnectedAP iedName="AA1_D1_Q03P1" apName="S1">
    <Address>
        <P type="IP">172.16.0.1</P>
    </Address>
    <GSE cbName="GoCB01" ldInst="Prot">
        <Address>
            <P type="APPID">3000</P>
            <P type="VLAN-ID">0</P>
            <P type="VLAN-PRIORITY">4</P>
            <P type="MAC-Address">01-0C-CD-01-00-00</P>
        </Address>
    </GSE>
</ConnectedAP>
```

IED section

```xml
<IED name="AA1_D1_Q03P1" type="GENSCL" sxy:x="2" sxy:y="8">
    <AccessPoint name="S1">
        <Server>
            <Authentication />
            <LDevice inst="Prot">
                <LN0 lnType="TopCalLN0" lnClass="LLN0" inst="">
                    <DataSet name="Protection">
                        <FCDA lnClass="PTRC" ldInst="Prot" prefix="Q03" lnInst="1"
                            doName="Tr" fc="ST" />
                        <FCDA lnClass="RBRF" ldInst="Prot" prefix="QA1" lnInst="1"
                            doName="OpIn" fc="ST" />
                    </DataSet>
                    <GSEControl name="GoCB01" appID="GoCB01" datSet="Protection">
                        <IEDName>AA1 D1 Q03P1</IEDName>
                    </GSEControl>
                </LN0>
                <LN lnType="TopCalLPHD" lnClass="LPHD" inst="1" />
            </LDevice>
        </Server>
    </AccessPoint>
</IED>
```

| Original (LAN) | | | | Translated (WAN) | | |
|---|---|---|---|---|---|---|
| MAC DA | VLAN ID | APPID | Number of destination substations | MAC DA | VLAN ID | APPID |
| MAC_DA_LAN_A | VLAN_ID_LAN_A | APPID_LAN_A | 1 | MAC_DA_WAN_A | VLAN_ID_WAN_A | APPID_WAN_A |
| MAC_DA_LAN_B | VLAN_ID_LAN_B | APPID_LAN_B | 3 | MAC_DA_WAN_B1 | VLAN_ID_WAN_B1 | APPID_WAN_B1 |
| | | | | MAC_DA_WAN_B2 | VLAN_ID_WAN_B2 | APPID_WAN_B2 |
| | | | | MAC_DA_WAN_B3 | VLAN_ID_WAN_B3 | APPID_WAN_B3 |

Fig. 7

| Original (WAN) | | | Translated (LAN) | | |
|---|---|---|---|---|---|
| MAC DA | VLAN ID | APPID | MAC DA | VLAN ID | APPID |
| MAC_WAN_A' | VLAN_WAN_A' | APPID_WAN_A' | MAC_LAN_A | VLAN_LAN_A | APPID_LAN_A |
| MAC_WAN_A" | VLAN_WAN_A" | APPID_WAN_A" | | | |
| MAC_WAN_B' | VLAN_WAN_B' | APPID_WAN_B' | MAC_LAN_B | VLAN_LAN_B | APPID_LAN_B |
| MAC_WAN_B" | VLAN_WAN_B" | APPID_WAN_B" | | | |

TUNNELLING TIME-CRITICAL MESSAGES BETWEEN SUBSTATIONS OVER WAN

FIELD OF THE INVENTION

The invention relates to the field of inter-substation communication over a Wide Area Network WAN, in particular, to tunneling time-critical messages between substations over a WAN.

BACKGROUND OF THE INVENTION

The essential elements of the Open Systems Interconnection model OSI Layer 2, e.g. Ethernet, service between IEDs in different substations can be realized over a packet switched network using pseudo wires. A Pseudo Wire PW is a bidirectional entity which offers the mechanism to emulate the essential attributes of a native service over a Packet-Switched Network PSN.

RFC 3985 of the Internet Engineering Task Force IETF describes the architecture for pseudo wire emulation between any two customer edges CEs. The native communication between one customer edge and another customer edge over a PSN is enabled via provider edges PEs. The provider edge devices offer one or more pseudo wires for their customer edges to communicate over the PSN. The provider edges are connected via PSN tunnels that are identified by their PSN labels. A tunnel can carry one or more pseudo wires. The pseudo wires in the tunnel are identified by their pseudo wire labels. The payload that is transmitted from a sender CE is received at the receiver CE in the same form as transmitted by the sender CE i.e. the PSN is transparent to the customer edges.

RFC 5603 of the IETF describes a model for managing Ethernet pseudo wires over a PSN. The model defines port based pseudo wire and VLAN based pseudo wire, with or without manipulation, i.e. changing, adding or removing, of VLAN IDs. The port based pseudo wire connects two physical Ethernet end points while the VLAN based pseudo wire connects two virtual Ethernet end points. RFC 5602 of the IETF describes a model for managing pseudo wire services over MPLS tunnels. A pseudo wire is formed by establishing two Label Switch Paths LSPs, which are essentially unidirectional tunnels.

The Layer 2 traffic in substations, such as time-critical GOOSE and SV messages according to IEC 61850, is typically segmented using VLANs that ensure that the traffic reaches only the subscribed IEDs. This implies that the pseudo wires to other substations have to be configured based on these VLAN IDs. However, it should be noted that the VLAN ID used for Layer 2 traffic could be in conflict at PE because the other client CEs attached to the PE may use same VLAN ID for transporting a different traffic. This implies that the VLAN ID should be translated at egress in the sender substation or an outer 802.1Q VLAN tag should be added. Conversely, the modified VLAN ID should be translated again to the original, or a different VLAN ID at ingress into the receiver substation or the outer VLAN tag should be removed.

IEC 61850-90-1 technical report provides an overview of the different aspects that need to be considered for information exchange between substations. The report also proposes two approaches for inter-substation communication namely tunneling and gateway. The former approach encapsulates IEC 61850 messages for transport over PSN tunnels. The "tunneling" approach encapsulates the message for transport over WAN but does not modify the payload within the message. The "proxy gateway" approach uses a proxy to re-create messages that are sent by the devices in other substations via WAN. It also translates the content of the message in accordance with the transport protocol used in WAN. In other words, the "proxy gateway" approach does a protocol conversion between IEC 61850 and the PSN transport protocol. Apparently, the gateway should be fully aware of the content of the IEC 61850 messages.

The tunneling approach for GOOSE and SV exchange can be realized using Layer 2 Virtual Private Networks VPNs over MPLS backbone. The MPLS protocol may be IP/MPLS or MPLS-TP. The pseudo wires are the basis for transport over such packet switched network. Pseudo wire is a bidirectional entity that offers the mechanism for emulating a native service over a packet switched network such that it is transparent to the nodes that use the native service. Different connectivity types such as point to point, point to multipoint, or multipoint to multipoint can be realized using pseudo wires. The pseudo wires can transport multiplexed, i.e. VLAN based, or non-multiplexed, i.e. port based, service over MPLS backbone. Different pseudo wire redundancy mechanisms, e.g. 1+1 backup, can be used to provide fault tolerance. The pseudo wires terminate at the edge devices of service providers. The substation WAN edge devices connect to the WAN via the provider edge devices.

However, the conventional substations are not envisioned for inter-substation communication. This implies that the configurations for the substations are derived considering only information and communication model that are applicable within those substations. The extension of substation configuration for inter-substation communication should deal with potential naming and addressing conflicts. This is because IEC 61850 recommends unique values for system wide identification/resolution of certain naming and address parameters, e.g. LDName, VLAN, Multicast address, APPID, goID, svID etc. However, in many applications such as protection, multiple substations are engineered in the same way, where the naming and addressing parameters of IEC 61850 information model in a substation may match with that of the IEC 61850 information model in other substations.

The conflicts of naming and address can be resolved by renaming the message parameters. But this will effect a reconfiguration in some of the devices, that do not take part in "direct coordination" with devices in remote substations or that are not necessarily involved in the WAN communication, in already energized substations. The problem becomes more complex when the substation communicates with more than one substation. This is because the likelihood of naming and addressing conflicts becomes even higher. IEC 61850-90-1 proposes engineering of IEC 61850 communication among substations for tunneling approach based on SED file exchange, with the presumption of a "Greenfield" scenario, where conflicts can be resolved by granting of dataflow engineering rights to other substation projects. However, the standard does not address the naming and/or addressing conflicts that can occur when extending already commissioned substations for inter-substation communication.

In summary, in order to solve the naming and addressing conflicts, most of the utilities will be disinclined to reconfigure the devices in their energized substations. The reconfiguration of the devices may cause interruption of the substation operation.

DESCRIPTION OF THE INVENTION

There is a need for a solution that can resolve naming and/or addressing conflicts, that requires less reconfiguration of the substations and reduces the interruption of the substation operation.

The present invention provides not only the possibility to tunnel IEC 61850 Layer 2 traffic over the WAN but also the capability to perform rapid hardware translation of naming and address parameters to keep the reconfiguration of existing devices to a minimum.

This objective is achieved by a method and a device according to the independent claims. Preferred embodiments are evident from the dependent patent claims.

The present invention provides a method of transmitting time-critical messages in an OSI layer 2 network tunnel from a first IED in a first substation to a second IED in a second substation over a WAN, wherein each of the first and second substation comprises an edge IED and is associated with a substation LAN, wherein each of the time-critical messages comprises message parameters, wherein the method comprises the steps of: a) creating a translation table comprising corresponding values of the message parameters, for one of the substation LANs and the WAN or for each substation LANs and the WAN, b) defining a virtual IED, i.e. a virtual IED model, in the second substation using the translated values of the message parameters, to impersonate the first IED in the first substation, c) translating the message parameters according to the translation table, d) forwarding the time-critical messages from the first IED to the WAN, and e) receiving the time-critical messages by the second IED from the WAN.

The virtual IED in the second substation can be either specified in the edge IED of the second substation or exists as a separate description. Since the virtual IED is configured using the translated values of the message parameters and can therefore impersonate or simulates the first IED which is the real sender of the time-critical messages. Consequently, the receiving IED that is the second IED of the second substation believes that the time-critical messages are sent by the virtual IED in the second substation.

The method of the present invention can be used in the tunneling mechanism according to IEC 61850-90-1, where the multiple substation networks are connected to allow "direct coordination" of functions in remote substations. The time-critical messages to be transmitted between the substations are usually GOOSE and/or SV messages. The parameters of the time-critical messages are used to identify the messages and are usually comprise one of the following identifiers: destination MAC address, VLAN ID, LDName that is within "gocbRef" of GOOSE message and within "dataset" of GOOSE and SV messages, APPID, goID, or svID etc. The WAN may be either a circuit-switched or a packet-switched network. The translation of all parameters is possible. However, often only a subset, i.e. one or more of the aforementioned identifiers, might be required. This can be varied from case to case.

The steps of creating the translation table and translating the parameters are carried out by the edge IED of the first or the second substation. In particular, at least the translation of the VLAN ID of the time-critical messages is performed by the edge IED of the first substation. This is necessary for forwarding the messages from the first substation LAN to the WAN. The edge IED of the first substation may further translate the other parameters such as MAC, APPID etc. On the receiving side, the edge IED of the second substation may also translate the time-critical messages received from the WAN.

In case the translation function is not implemented in the edge IED of the first substation, e.g. the edge IED comes from third party or is no longer up to date, that edge IED is not capable to do the translation of the other parameters. In this case the translation may be carried out by the edge TED of the second substation.

In comparison with the "proxy gateway" approach introduced in the IEC 61850-90-1, the present invention enables a rapid transmission of the time-critical messages by on the fly hardware translation of messages.

The message parameters form the identifier of that message. By translating the conflicting message parameters, i.e. modifying the values of the parameters if necessary, the parameters becomes unique within a substation. Thus, the identifier also becomes unique. This avoids making extreme changes to current configuration of the substations, since there is no naming or addressing conflict after translation of the parameters. The message parameters is usually defined in form of metadata in the message header. The message header together with the messages body, i.e. the message payload, form the entire content of the message. The present invention is aimed to avoid naming or addressing conflict by merely modifying the message header, in case of need, in order to make the message parameters unique within each of the substations. When a message parameter is already unique within all substations, no modification is required, i.e. the value of the original message parameter and translated parameter in the translation table are the same. This will be explained in more detailed later on with the description relating to FIGS. 7 and 8. The present invention does not need to modify or reconstruct the message payload.

The virtual IED enables that the second IED of the second substation believes that the messages are sent from the virtual IED rather from the real sender, i.e. the first IED in the first substation. This allows that the messages being interpreted from the first to the second substation in a transparent manner. The virtual IED model may be a definition in Substation Description Language SCL, i.e. it may be a section in the Substation Configuration Description SCD file. The virtual IED represents an IED which does not necessarily exist as a hardware component. The virtual IED may also be integrated in the edge IED.

According to another aspect, the present invention also provides an apparatus of transmitting time-critical messages in OSI layer 2 network tunnel from a first TED in a first substation to a second IED in a second substation over a WAN, wherein the first and second substation are associated with a first and second substation LAN respectively, wherein the apparatus comprises: an edge device being adapted to translate message parameters of the time-critical messages according to a translation table comprising corresponding values of message parameters for the first and/or second substation LAN and the WAN; and a virtual IED model defined in the second substation using the translated values of the message parameters, and adapted to impersonate emulating the first IED in the first substation.

According to another aspect, the present invention provides a system of transmitting time-critical messages in OSI layer 2 network tunnel from a first IED in a first substation to a second IED in a second substation over a WAN, wherein the first and second substation are associated with a first and second substation LAN respectively, wherein the system comprises: a first and second edge IED arranged in the first and second substation LAN respectively, and adapted to translate message parameters of the time-critical messages according to a translation table comprising corresponding values of message parameters for the first and/or second substation LAN and the WAN; and a virtual IED defined in the second substation using the translated values of the message parameters, and adapted to impersonate the first IED in the first substation.

According to the present invention, the translation of the parameters of the time-critical messages is performed by replacing the values of the message parameters in the time critical messages according to the translation table.

According to a preferred embodiment of the present invention, the translation is performed by the edge IED in OSI layer 2. In comparison with modifying message parameters using software in higher OSI layer, using OSI layer 2 enables an on-the-fly translation that can be done during the message transmission and on the hardware wires. This can minimise delays caused by the translation of the message parameters and keep the translation time as short as possible. Further, the edge IED can monitor the OSI layer 2 network tunnel and notify the protection IEDs and Supervisory Control and Data Acquisition, SCADA, e.g. when a status change of the communication channel occurs.

According to a preferred embodiment of the present invention, the method further comprises the step of: selecting relevant time-critical messages from the time-critical messages, prior to the step of translating.

The relevant time-critical messages have a destination of the second substation, i.e. if a message is not supposed to be delivered to the second substation, it will not be forwarded for further processing such as translation. An additional criteria of the relevance of the message may be the information contained in the messages, which is required for proper operation of the second substation, e.g. the information about the status change of certain breaker in the first substation, which may have impact on the operation of the second substation.

The step of selecting enables filtering the time-critical messages so that only the relevant or qualified messages are sent to the second substation. This avoids the second substation being flooded with unnecessary messages.

Preferably, the step of creating translation table, selecting messages and translating the attributes are performed by the edge IED of the first substation.

Preferably, the step of translating is performed n times, where n is the number of substations that receive or send the time-critical messages from or to the WAN. In other words, if the messages need to be transmitted to three substations, the translation may be performed three times, which makes sure that there is no naming or addressing conflict in all three substations that receive the messages. Alternatively, n may also correspond to the number of redundant pseudo wires via which the time-critical messages are received from the WAN.

Preferably, the translation table comprises: an egress translation table for transmission of the time-critical messages from a substation LAN towards WAN, and an ingress table for the time-critical messages from the WAN to a substation LAN.

According to a further aspect, the present invention also provides an engineering process for obtaining the apparatus and the systems according to the present invention. The engineering process may comprises the steps of importing a configuration file of the edge IED of the second substation into a system engineering tool for the second substation, and obtaining the SCD file of the second substation, and inputting the SCD file into a virtual IED engineering tool comprising means for generating instantiated IED descriptions for the virtual IED and the edge IED.

Preferably, the engineering process further comprises the steps of generating a first instantiated. IED description IID for the virtual IED, wherein physical device information proxy name of the virtual IED is set to name of the first IED in the first substation; generating an instantiated IED description IID for the edge IED based on channel link defined between communication interface instances of the first and second substation; and importing the first and second IID into the system engineering tool for the second substation

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
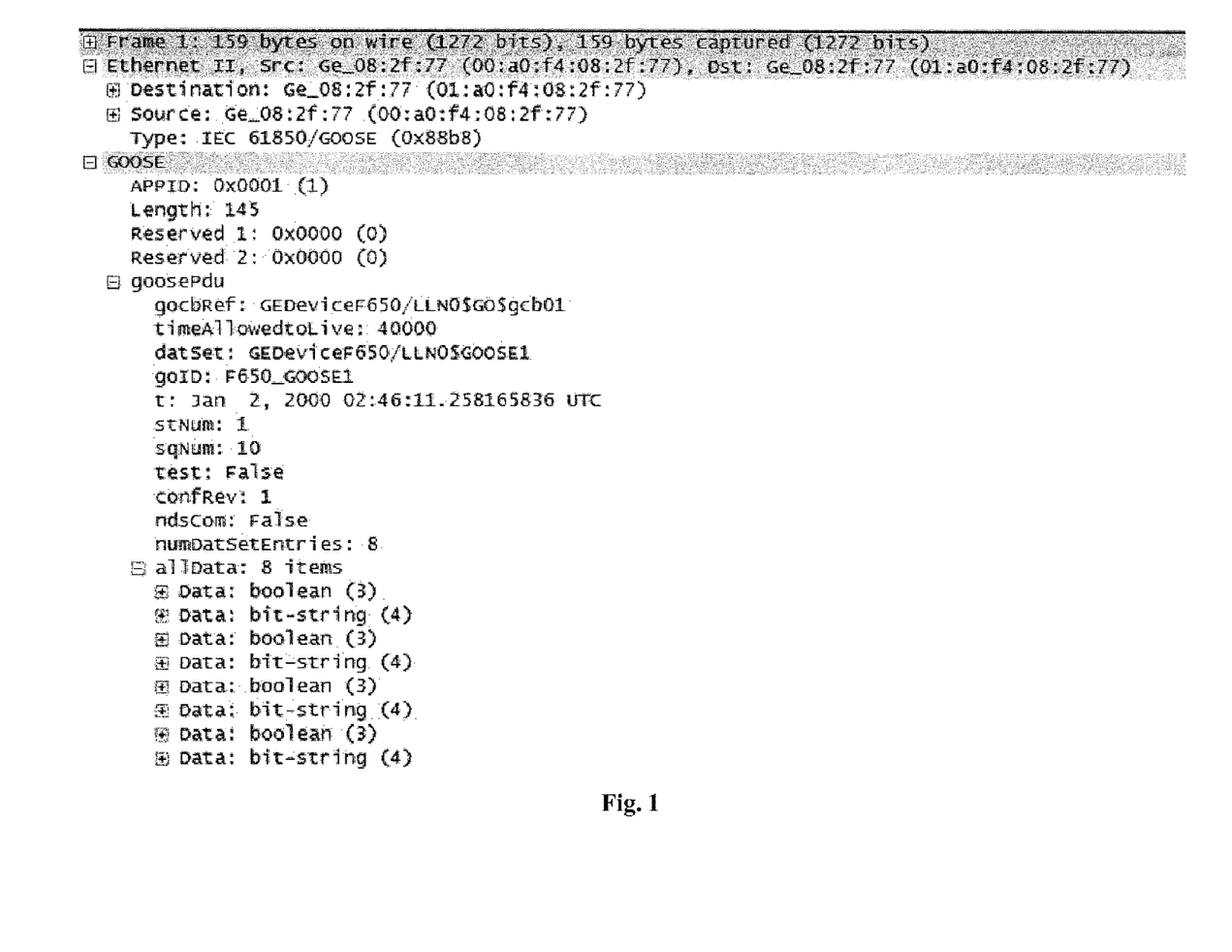
FIG. 1 schematically shows a typical GOOSE frame structure sent by a conventional IED, where the GOOSE frame includes message parameters such as APPID, gocbRef, dataSet and goID.

FIG. 1 shows an exemplary time-critical message frame, here the GOOSE frame, in the layer 2 tunneling communication. As shown, the GOOSE frame contains message parameter such as APPID, gocbRef and goID. The value of these message parameters should be unique within a substation, according to the IEC standard.

Figure 2:
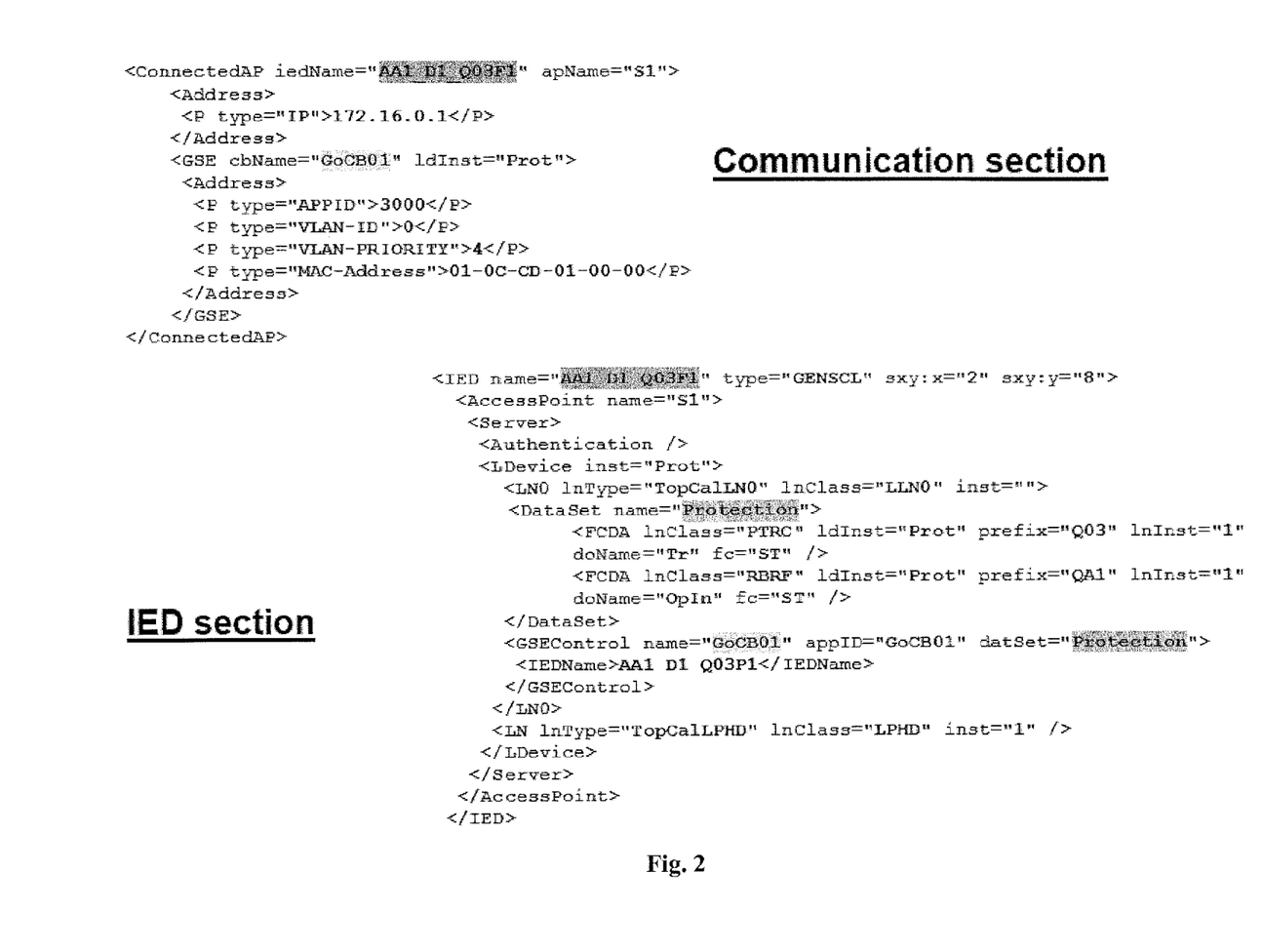
FIG. 2 schematically shows an exemplary SCD file including the communication section and the IED section.

FIG. 2 shows an exemplary Substation Configuration Description SCD file, where the upper part contains information for communication and the lower part relates to an IED description. In the communication part, several parameters such as APPID, VLAN ID and destination MAC are defined, which are required for the transmission of messages between the substations.

In particular, the GOOSE and SV traffic in substations are typically segmented using VLANs to ensure that the traffic only reaches the subscribers. The VLAN ID of the GOOSE and SV traffic to WAN typically share the same substation WAN edge device, i.e. edge IED. This implies that multiplexed service based on VLANs will be used for communication over WAN. The mapping of VLANs to pseudowires is configured in the service provider's edge device. It could happen that the VLAN TD used for the GOOSE or SV traffic in the sending substation is already in use for segmenting some other GOOSE or SV traffic within a receiving substation. This implies the VLAN ID has to be modified in order to avoid any reconfiguration in the receiving substation. The same applies for other system wide unique values for GOOSE and SV message parameters such as MAC address, APPID, svID, goID, LDName within "gocbRef" of GOOSE message and LDName within "dataset" of GOOSE and SV messages.

Figure 3:
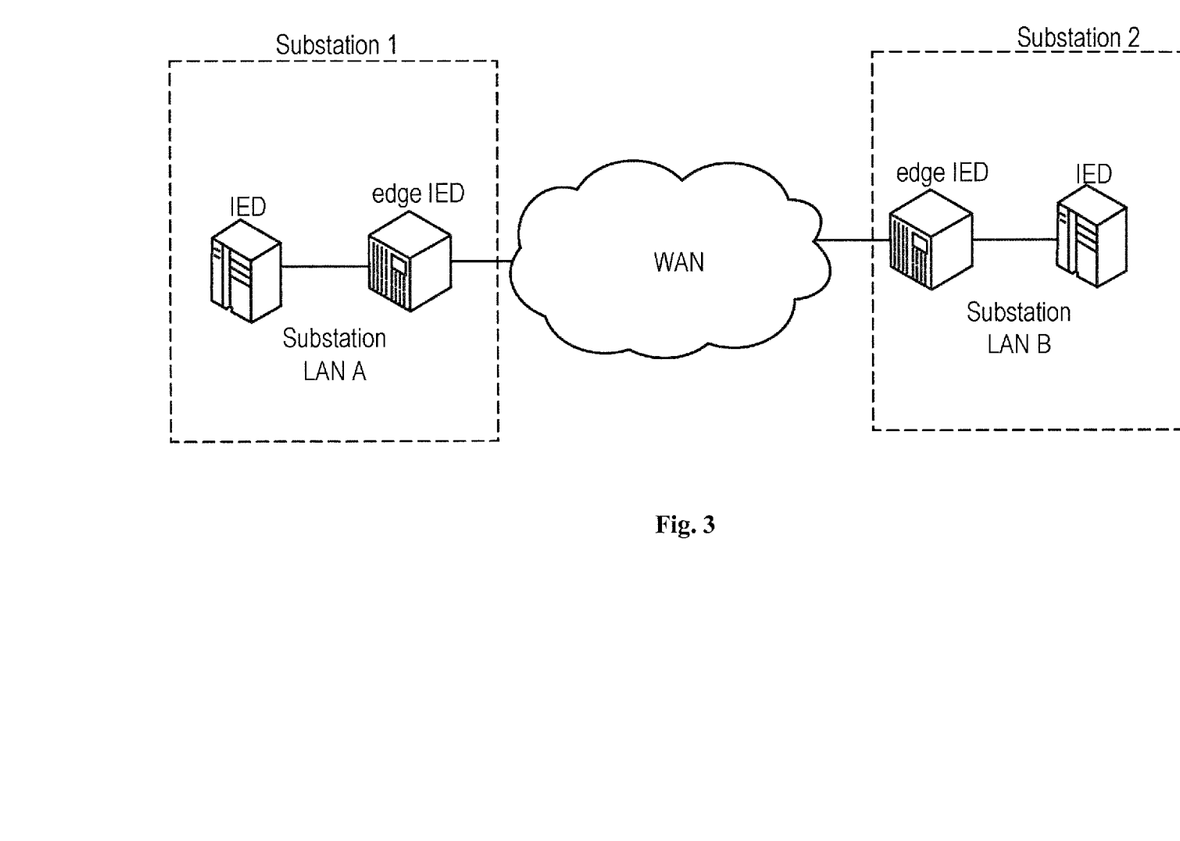
FIG. 3 schematically shows a tunneling communication between the substations over a WAN.

FIG. 3 shows the schematic structure for communication between substations over a WAN, either through circuit-switched network or packet-switched network, according to the "tunneling approach" of IEC 61850-90-1. The interface between the protection IED and edge IED may be an Ethernet. As shown the substation 1 is associated with substation LAN A, whereas the substation 2 is associated with substation LAN B. The inter-substation communication of the time-critical messages is across LAN A and B over the WAN.

Figure 4:
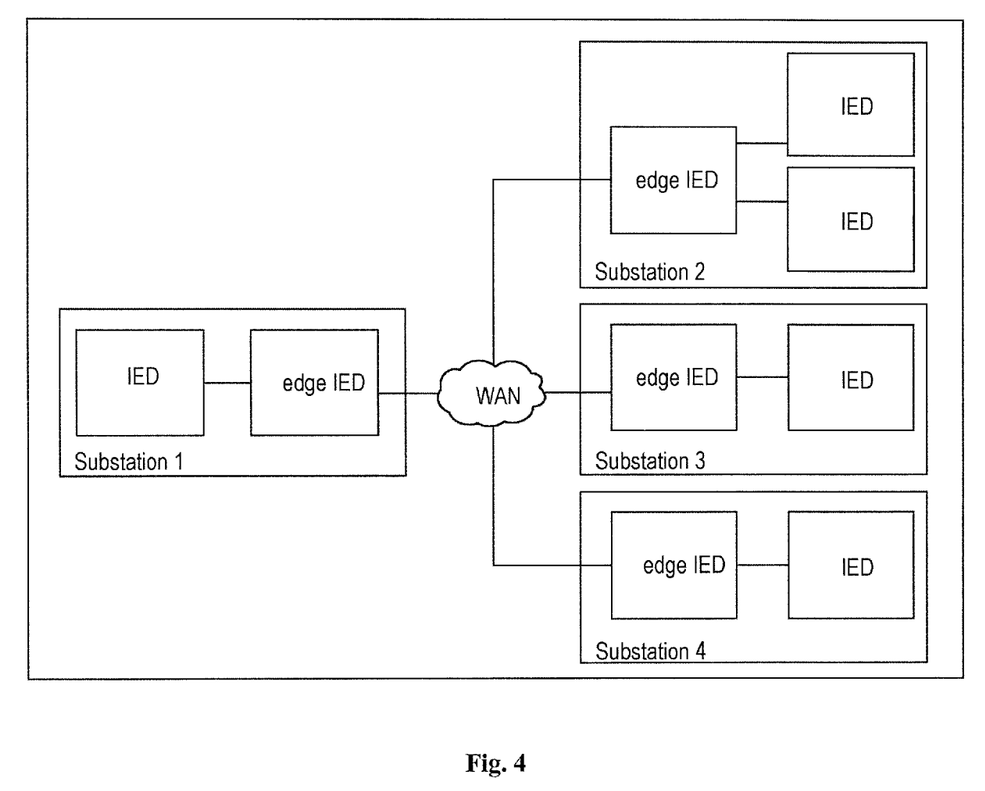
FIG. 4 schematically shows a network topology of a plurality of substations connected with a WAN.

FIG. 4 shows a shows inter-substation communication over the WAN, where each substation comprises an IED and an edge IED. In order to achieve the tunneling functionality, the present invention proposes that the edge IED incorporate translation function and optionally also the filtering function which is described in a later section of the present invention, e.g. FIG. 6. The time-critical messages may be sent from the substation 1 over the WAN towards the substations 2, 3 and 4.

Figure 5:
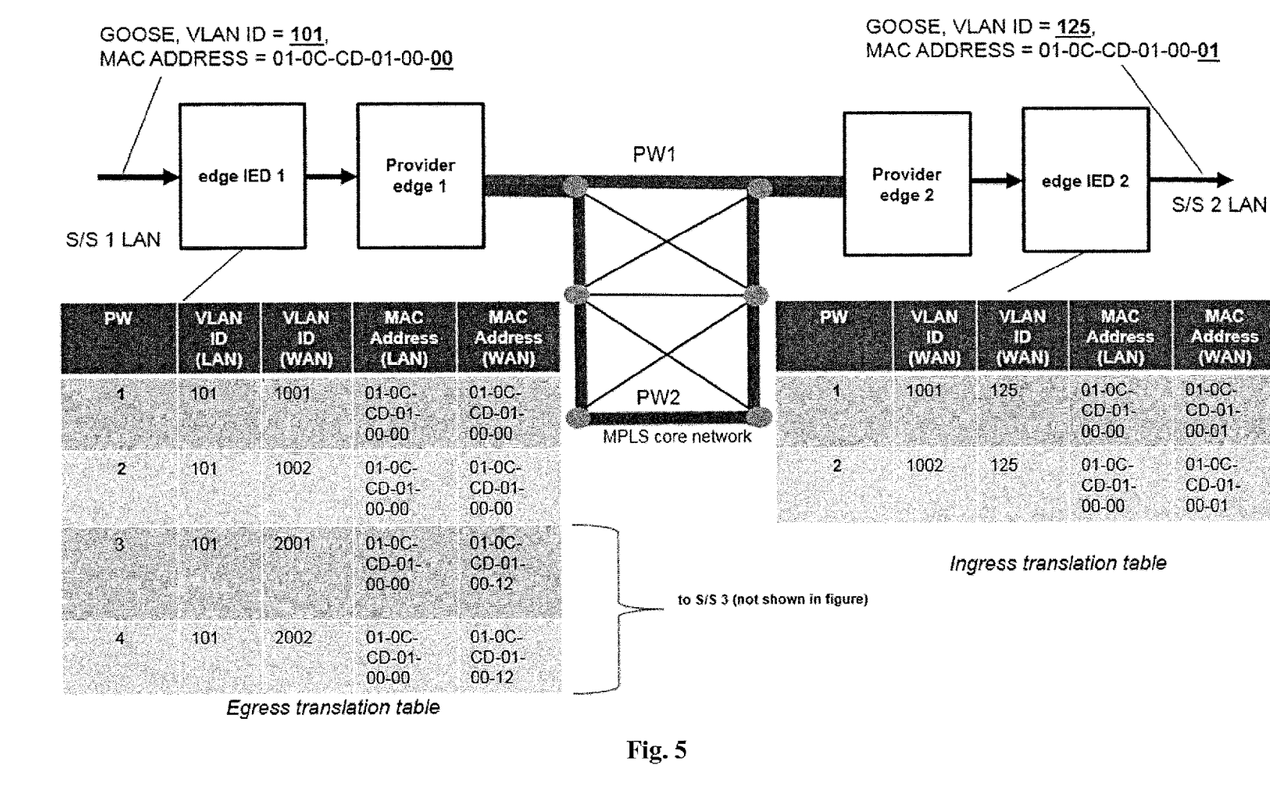
FIG. 5 schematically shows the translation process including the egress and ingress translation table, according to a preferred embodiment of the present invention.

FIG. 5 shows an preferred embodiment according to the present invention in which the reconfiguration can be avoided by performing a near physical bit rate, low latency, hardware translation of conflicting parameters in GOOSE and SV telegrams at the substation edge IEDs for the case of 1+1 pseudo wire redundancy.

It should also be noted that the VLANs used for GOOSE or SV traffic could be in conflict at the service provider's edge device. This is because there can be other customer edge devices, connected to the service provider's edge device, that use the same VLAN IDs for transporting their traffic. This implies that the VLAN ID may need to be modified or an outer 802.1Q VLAN tag, also referred as "QinQ", can be added by the edge IED to resolve the VLAN conflicts in WAN. In addition, the edge IED can take care of duplicating the flows, i.e. to assign different VLAN IDs, according to the pseudo wire redundancy mechanism, e.g. 1+1. This implies that the substation edge IED should be capable of translating VLAN tags at egress from LAN to WAN and at ingress from WAN to LAN. It should also be able to filter unwanted VLAN traffic from WAN to LAN and vice versa.

The translation of conflicting parameters in GOOSE and SV telegrams can be done at egress to WAN or at ingress from WAN. The translation at egress to WAN may be necessary in case the edge IED at the receiving substation is not capable of translating the above parameters. The VLAN translations for resolving conflicts in WAN and filtering of unwanted traffic can also be realized in the same hardware of edge IED. In order to perform these translations and filtering, the hardware can be configured with ingress and egress translation table as shown in FIG. 5 for the case of VLAN and MAC address translation.

Two VLAN based redundant point to point pseudo wires PW1, PW2 arc used to connect the edge IED 1 in one substation to the edge IED 2 in another substation via a MPLS backbone. The pseudo wires provide 1+1 active redundancy in the MPLS backbone. Accordingly, the edge IED will duplicate the message and assign two distinct VLAN IDs that are mapped to 1+1 pseudo wires. The VLAN conflicts in the service provider edge is resolved by translating to a VLAN ID that is not in use within WAN at egress and back again to a VLAN ID that is not in conflict within the receiving substation. The first valid message received from one of the pseudo wires is forwarded to the substation LAN of the receiving substation. As shown in FIG. 5, there are egress and ingress translations of a GOOSE message by the edge IED 1 and 2 in two substations. It should be noted that in case a GOOSE or SV message is multicast to two or more substations then the edge IED may duplicate the message and send them over their respective 1+1 pseudo wires to the different substations.

The edge IED should also be able to monitor the status of different channels and to inform the protection IEDs and local SCADA about the channel status changes via IEC 61850 communication services. It may also monitor GOOSE and SV messages from/to WAN to create event/ disturbance records. This implies that a substation edge IED is more than a switch as supposed by IEC 61850-90-1. It can be viewed as an IED that on one hand offers IEC 61850 services to devices in substation LAN and on the other hand connects to WAN via the provider edge device. Apparently, a substation WAN edge device is a special IED that not only requires engineering according to IEC 61850 for providing native IEC 61850 services to the devices in substation LAN but also requires WAN communication engineering.

Figure 6:
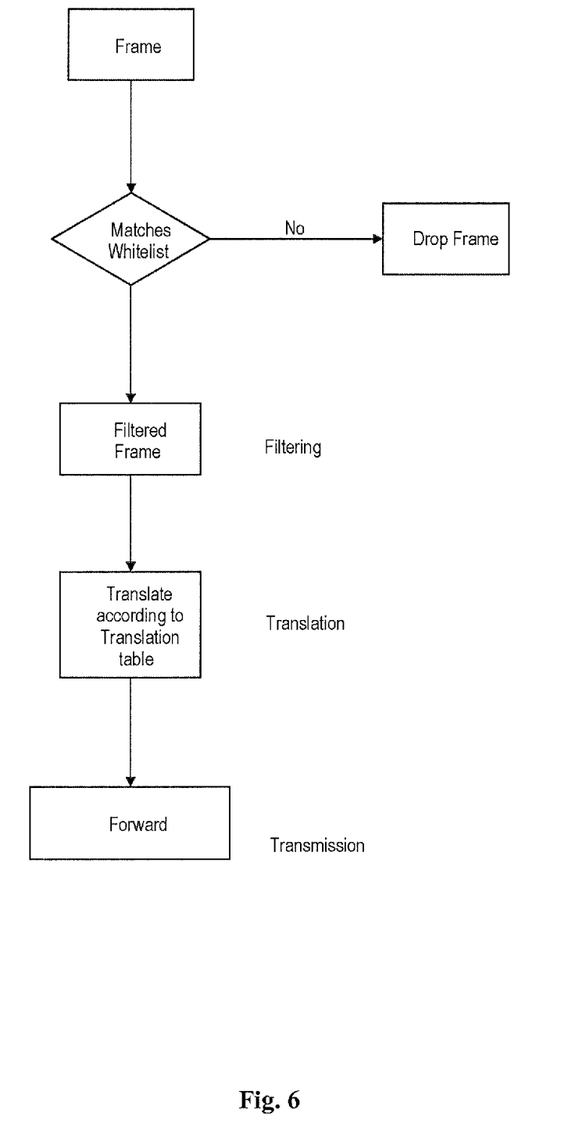
FIG. 6 schematically a diagram of a preferred embodiment of the present invention, where a filtering of the messages is performed prior to the translation of the message.

FIG. 6 shows the filtering module for selecting the time-critical messages. The frames including GOOSE and SV going from LAN to WAN are filtered by the filtering module so that only relevant, i.e. only the qualified GOOSE and SV frames can be passed to the WAN. The filter may use attributes such as EtherType field, of the Ethernet protocol, APPID etc. to distinguish between GOOSE, SV and other frame types. The filter may have a whitelist with parameters such as APPID, destination MAC and VLAN ID. All GOOSE and SV frames which are forwarded to the WAN may pass the whitelist before the translation functionality is applied. This avoids flooding unwanted messages to the other substations or WAN. The filtering function is an optional feature describing a preferred embodiment of the invention.

Figure 7:
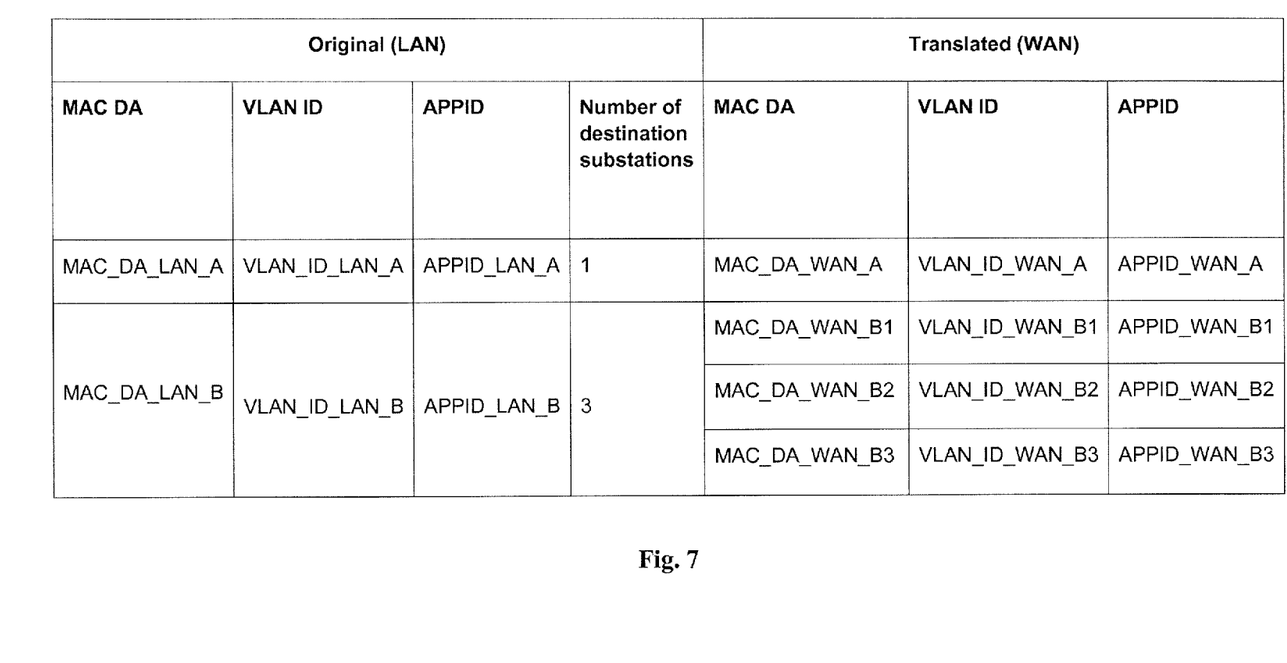
FIG. 7 shows an example of translation table including parameters with values for LAN and translated values of these parameters for WAN, according to the present invention.

FIG. 7 shows a translation table that maps between attributes such as Destination MAC address, APPID and VLAN ID triples of filtered frames going to WAN from LAN. For example, the parameter VLAN ID is VLAN_ID_LAN_A in the LAN. After the translation for WAN, it becomes VLAN_ID_WAN_A. In other words, the value of VLAN ID in the substation LAN is already in use in WAN and will be modified after translation. If there is no conflict for a particular VLAN ID, no modification of the value is required. The translation table represents a mapping of the values of the message parameters which makes sure that no naming and addressing conflict exists after its translation.

In case of multicast communication, the translator may translate the original attributes n number of times with different set of translated attributes for each destination, e.g. the VLAN_ID in LAN B is translated three times.

Figure 8:
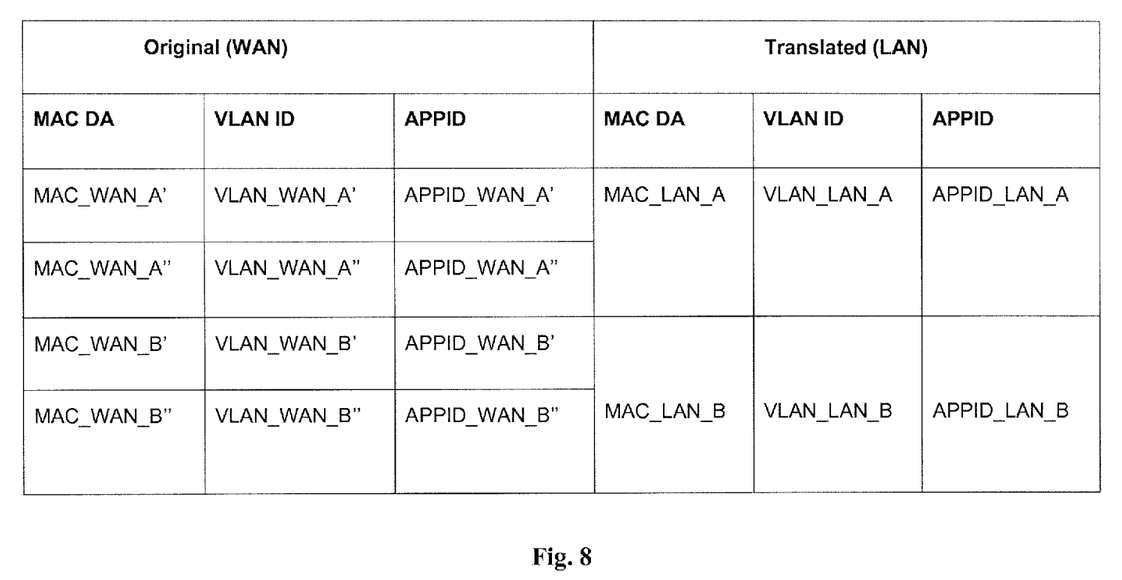
FIG. 8 shows a further example of translation table including parameters with values for WAN and translated values of these parameters for LAN, according to the present invention.

FIG. 8 the translation module maps between MAC Destination address, APPID and VLAN ID triples of filtered frames going to LAN from WAN. The translation module also takes into consideration of redundant frames, e.g. A' and A" frames, B' and B" frames in FIG. 8.

In addition to translation and filtering, the tunneling features can also benefit using the following: redundancy, in order to increase reliability of the communication, the frames going from LAN to WAN are duplicated and all the duplicates are removed on the receiving side.

Figure 9:
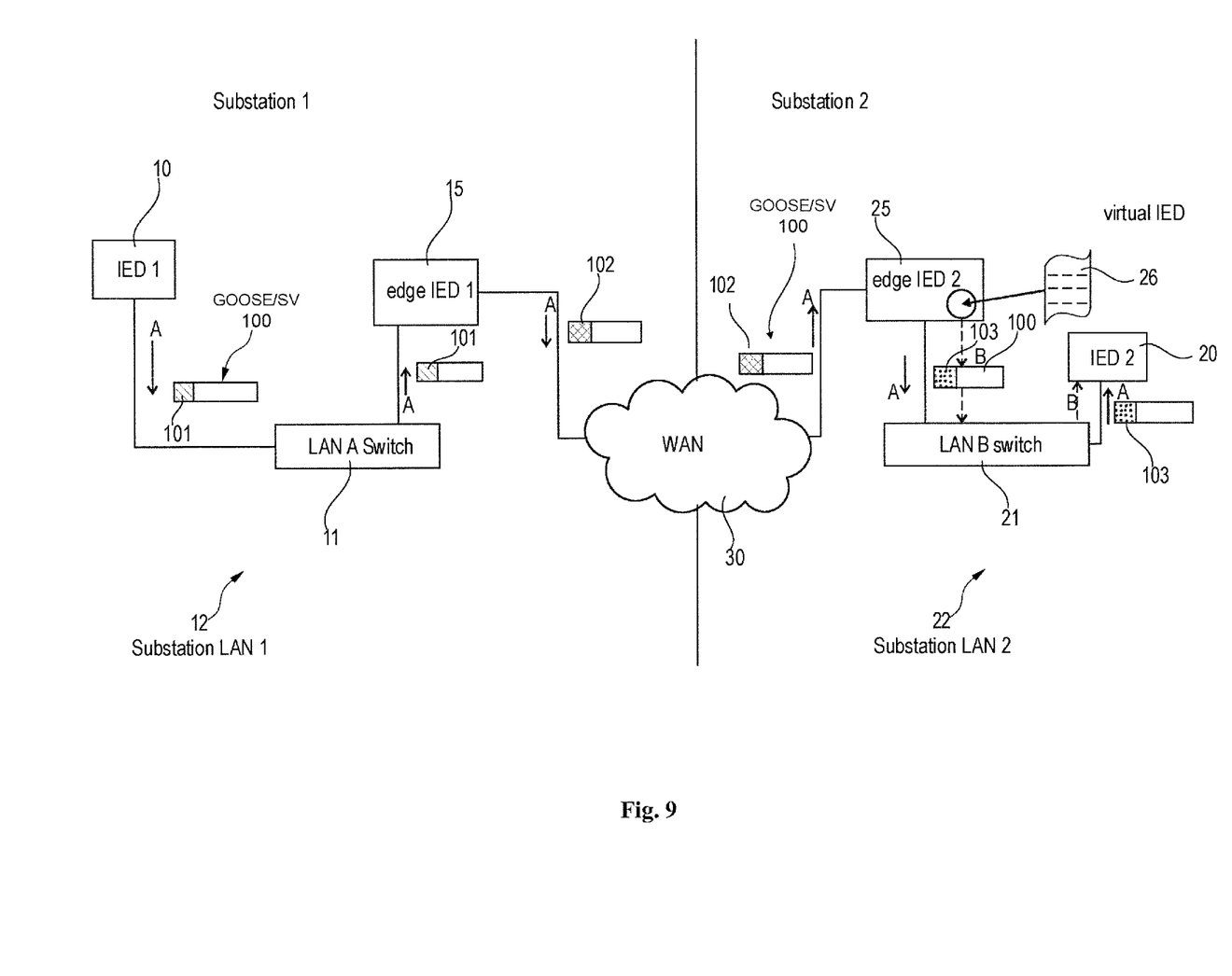
FIG. 9 schematically shows two substations connected over the WAN, wherein each of the substation comprises an IED for sending or receiving messages, an edge IED for translating the messages, and wherein the second substation receiving the messages sent by the first IED comprises a virtual IED that impersonate the first IED in the first substation.

FIG. 9 schematically shows an overview of the inter-substation communication according to the present invention. The two substations 1, 2 are connected over the WAN 30, wherein each of the substation 1, 2 comprises an IED 10, 20 for sending or receiving a time critical message 100 including the message parameters 101, 103, and an edge IED 15, 25 for translating the message 100. The time-critical message 100 includes the message parameters 101 sent by the IED1 10 in the substation 1 may be translated by the edge IED1 15, in order to avoid naming and addressing conflicts during the transmission towards the WAN. The edge IED1 15 translates at least the message parameter VLAN ID, i.e. the translated message parameter 102 has at least a translated VLAN ID. Preferably, the edge IED 15 also translates the other parameters such as MAC, APPID, etc.

The translation is performed according to the translation table which has a corresponding table comprising the values of the message parameters 101 for the substation LAN 12 and the values of the message parameters 102 in WAN 30. The exemplary translation tables are provided in FIGS. 5, 7 and 8. In particular, the values of the message parameters 101 for the LAN 12 are replaced by the corresponding values of the message parameters 102 for the WAN. For instance, the VLAND ID for the LAN 12 is "101" according to the egress table of FIG. 5, and the corresponding VLAN ID for the WAN via PW4 is "2002". In other words, the message sent by the IED1 10 has a VLAN ID value "101" which is in conflict with other VLAN IDs in the WAN 30 or substation LAN 22; this conflicting VLAN ID value "101" becomes after translation "2002" which does not conflict with any VLAN IDs in the WAN or the substation LAN 22.

In case there is no conflict of a particular message parameter, both values in the LAN 12 and WAN 30 are the same. In this case, after the translation of the parameter, the value of the parameter is unchanged.

After the WAN 30 received the time-critical message 100 with the translated message parameters 102, it sends the message towards substation 2. As explained before, the preferred embodiment of the present invention is that the edge IED1 15 translates not only the VLAN ID but also the other parameters such as MAC, APPID etc., i.e. the message parameter 102 will be received by the IED2 25 in the second substation since no additional translation by the edge IED2 is necessary. If, however, the edge IED1 15 did not or is not capable to translate the other parameters such as MAC and APPID, the edge IED2 25 in the substation 2 can perform the translation of these parameters. Then, the message after the translation has the message parameters 103, as shown in FIG. 9.

The second substation further comprises a virtual IED model 26 that can mimic or impersonate the IED 10 of the substation 1. When the IED 20 in the substation 2 receives the message, it believes that the message 100 is sent from the virtual IED 26 through the path B not the actual path A. The receiving IED 20 does not have any naming or addressing conflicts since the translated message parameters 103 are unique within the substation 2.

In contrast to the "proxy gateway" approach as suggested by the IEC 61850-90-1, the translation of the message parameters does not recreate the whole message content but only modifies the message parameters on the fly if there are any potential naming or addressing conflicts. The translation step of the present invention can be performed at near physical bit rate, thereby avoiding delay or latency that may occur in the "proxy gateway" approach.

Moreover, since the virtual IED model 26 may be defined in the SCD description file, no additional hardware is required for the virtual IED. The virtual IED model impersonates the sending IED in a receiving substation, thereby the other IEDs in the receiving substation that are not the destinations of the message and that have naming or addressing conflicts with the tunneled message do not need to be reconfigured or updated for implementation of the present invention. The method according to the present invention provides a transparent transmission including a transparent translation for solving the naming or addressing conflicts, which not only reduces the reconfiguration of the substation but also requires merely a minimal effort for its implementation.

Hereinafter, the exemplary engineering process for obtaining the virtual IED model and configuration of the edge IED according to the present invention will be explained. The SCL engineering of IEC 61850 Layer 2 emulation over WAN according to the present invention considers the following:

Event recording: the edge IED is a subscriber of GOOSE messages that are sent to or received from other substations;

WAN communication: the virtual IED duplicates and assigns different VLAN IDs to GOOSE and SV messages which are multicast to more than one substation. The VLAN IDs are used to map the messages to their respective pseudo wires that connect to the different substations. Besides, it also translates VLAN ID, MAC address and APPID of the messages at egress to WAN and at ingress from WAN.

The virtual IED mimics or emulates a device with special features. It can be viewed as an IED that on one hand offers IEC 61850 services to devices in substation LAN and on the other hand connects to WAN via the provider edge device. Apparently, the virtual IED not only requires SCL engineering according to IEC 61850 for providing native IEC 61850 services to the devices in substation LAN but also requires WAN communication engineering. In order to make the SCL engineering tasks and responsibilities clear the system level engineering is handled by system engineering tool and the project specific project specific IED instance, i.e. IID file, creation is handled by the virtual IED engineering tool that is explained later on.

The edge IED can be modeled as an IED that has a logical device comprising logical nodes such as LPHD, LLN0, LN ITPC1 . . . n, and LN RDRE. In particular, LPHD is a logical node representing common data of the physical device hosting the logical device. LLN0 is a logical node representing common data of the logical device. LN ITPC1 . . .

n is a logical node containing all information related to communication channel settings and supervision. There can be as many instances of this logical node corresponding to the maximum number of channels that is supported by the edge IED. The value specified in the data attribute "EEName.mRID", that represents a unique identification of an asset or device, is used to associate an LN ITPC instance to a WAN channel. LN RDRE is a logical node modeling the event recorder function.

Figure 10:
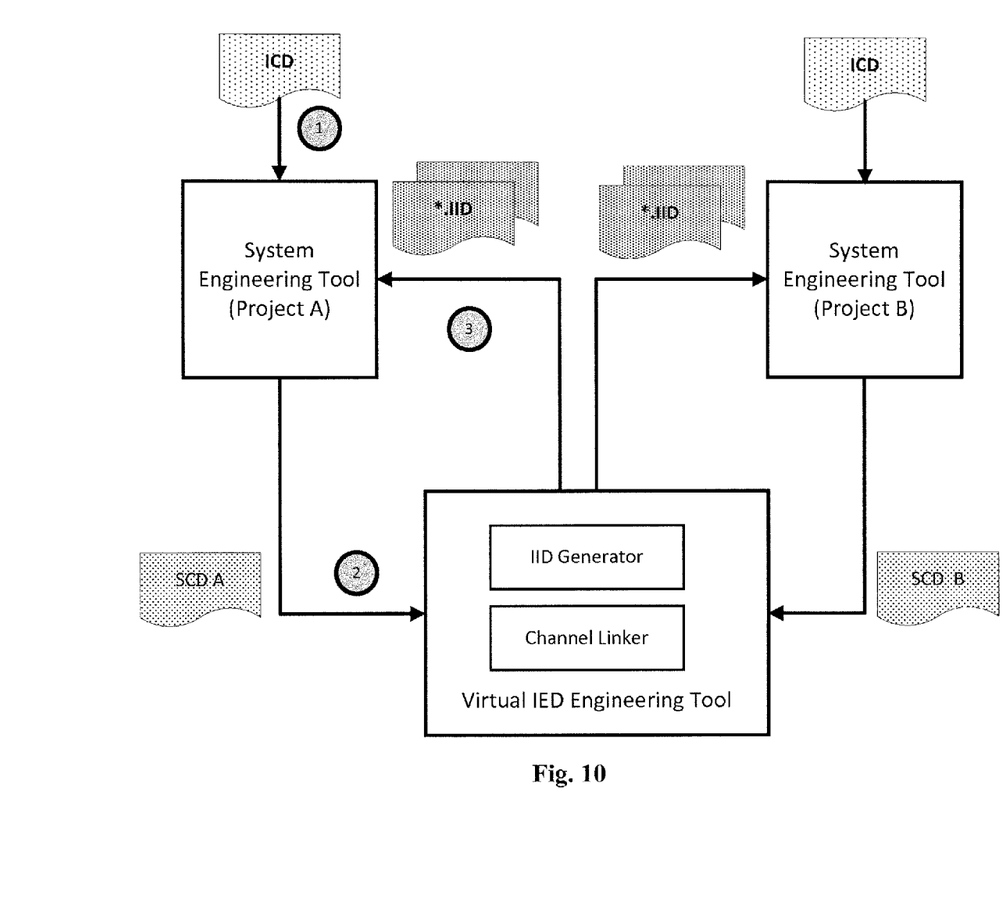
FIG. 10 schematically shows a Substation Configuration description Language SCL engineering process using virtual IEDs.

FIG. 10 shows an exemplary engineering process according to the present invention, where the Substation Configuration description Language SCL engineering process using virtual IEDs is described.

The IED Configuration Description ICD file of the edge IED is imported into substation project A, and likewise into substation project B, of system engineering tool. The SCD files thus obtained from Substation project A and Substation project B are input to the Virtual IED engineering tool shown in FIG. 10. The virtual IED engineering tool may comprise an IID Generator and a Channel Linker.

The IID Generator is used to generate Instantiated IED Descriptions IIDs for virtual IEDs. The IIDs for Substation A are generated based on the selected GOOSE or SV messages from IEDs in Substation B that are sent to IEDs in Substation A. The IIDs for virtual IEDs thus generated will have the physical device information LPHD data attribute "Proxy.stVal" set to true and the "PhyNam.name" set to the name of the IED in Substation B for which the IID is generated. Furthermore, it will only have the selected. GOOSE and SV service information.

The Channel Linker is used to generate an IID for the edge IED based on the channel link defined between the teleprotection communication interface ITPC instances of Substation A and Substation B. The IIDs corresponding to the virtual IEDs and the edge IED are then imported in project A of system engineering tool. Any addressing and naming conflicts are resolved during the import of virtual IEDs by assigning new values of the message parameters. The data flow between the virtual IEDs, edge IED and the IEDs in Substation A can then be engineered in project A of system engineering tool. This includes the data flow engineering for event recording in edge IED as well as the data flow engineering for IEDs in Substation A that are destinations of GOOSE or SV messages from Substation B.

The SCDs thus derived from both projects are used to derive the ingress and egress translation tables for the edge IEDs in Substation A and Substation B. The translation tables are built by identifying the virtual IEDs, their naming and addressing parameters in the other project. A virtual IED is identified by means of its physical device information "Proxy.stVal" data attribute, which will be true, and "PhyNam.name" data attribute, which will have the name of the counterpart IED in the other substation. The VLAN conflicts in WAN can also be resolved by translating to a different VLAN ID (on egress from a sending substation) that is not currently in use in WAN and translating it back (on ingress into a receiving substation) to a VLAN ID that is defined in the virtual IED corresponding to the GOOSE or SV message. The process of generating the translation tables can be part of a separate engineering tool or can be integrated into the virtual IED engineering tool.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of transmitting time-critical messages in an Open Systems Interconnection (OSI) layer 2 network tunnel from a first intelligent electronic device (IED) in a first substation to a second IED in a second substation over a Wide Area Network (WAN), wherein each of the first and second substation comprises an edge IED and is associated with a substation Local Area Network (LAN), wherein each of the time-critical messages comprises message parameters, wherein the method comprises the steps of:
   a) providing a translation table comprising corresponding translated values of the message parameters, between the first and/or second substation LAN and the WAN,
   b) configuring a virtual IED in the second substation using the translated values of the message parameters, to impersonate the first IED,
   c) translating the message parameters according to the translation table, by the edge IED of the first and/or second substation,
   d) forwarding the time-critical messages from the first IED to the WAN, and
   e) receiving the time-critical messages by the second IED from the WAN.

2. The method according to claim 1, wherein the step c) is performed by the edge IED in OSI layer 2, and wherein the edge IED is adapted to monitor the OSI layer 2 network tunnel.

3. The method according to claim 2, further comprising the step of: selecting relevant time-critical messages from the time-critical messages based on the messages parameters, prior to the step c).

4. The method according to claim 3, wherein the step c) is performed again after step d), and wherein the time-critical messages are GOOSE and/or SV messages.

5. The method according to claim 3, wherein the step of translating is performed n times, where n is an integer that defines the number of substations to which the time-critical messages are sent via the WAN or that corresponds to the number of redundant pseudo wires via which the time-critical messages are received from the WAN, and wherein the translation table comprises: an egress translation table for transmission of the time-critical messages from a substation LAN towards WAN, and an ingress table for the time-critical messages from the WAN to a substation LAN.

6. The method according to claim 3, wherein the parameters of the time-critical messages comprises at least one of the following identifiers: MAC, VLAN ID, APPID, svID, goID, or LDName that is within "gocbRef" of GOOSE message and within "dataset" of GOOSE and SV messages, and wherein the virtual IED is defined in a SCD file of the second substation.

7. The method according to claim 1, further comprising the step of:
   selecting relevant time-critical messages from the time-critical messages based on the messages parameters, prior to the step c).

8. The method according to claim 1, wherein the step c) is performed again after step d).

9. The method according to claim 1, wherein the time-critical messages are GOOSE and/or SV messages.

10. The method according to claim 1, wherein the step of translating is performed n times, where n is an integer that defines the number of substations to which the time-critical messages are sent via the WAN or that corresponds to the number of redundant pseudo wires via which the time-critical messages are received from the WAN.

11. The method according to claim 1, wherein the translation table comprises: an egress translation table for transmission of the time-critical messages from a substation LAN towards WAN, and an ingress table for the time-critical messages from the WAN to a substation LAN.

12. The method according to claim 1, wherein the parameters of the time-critical messages comprises at least one of the following identifiers: MAC, VLAN ID, APPID, svID, goID, or LDName that is within "gocbRef" of GOOSE message and within "dataset" of GOOSE and SV messages.

13. The method according to claim 1, wherein the virtual IED is defined in a Substation Configuration Description (SCD) file of the second substation.

14. The method according to claim 13, comprising the steps of:
   importing a configuration file of the edge IED of the second substation into a system engineering tool for the second substation, and obtaining the SCD file of the second substation,
   inputting the SCD file into a virtual IED engineering tool comprising means for generating instantiated IED descriptions for the virtual IED and the edge IED.

15. The method according to claim 14, further comprising the step of:
   generating a first instantiated IED description IID for the virtual IED, wherein physical device information proxy name of the virtual IED is set to name of the first IED,
   generating an instantiated IED description IID for the edge IED based on channel link defined between communication interface instances of the first and second substation, and
   importing the first and second IID into the system engineering tool for the second substation.

16. An apparatus of transmitting time-critical messages in Open Systems Interconnection (OSI) layer 2 network tunnel from a first intelligent electronic device (IED) in a first substation to a second IED in a second substation over a Wide Area Network (WAN), wherein the first and second substation are associated with a first and second substation Local Area Network (LAN) respectively, wherein the apparatus comprises:
   an edge device being adapted to translate message parameters of the time-critical messages according to a translation table comprising corresponding translated values of message parameters for the first and/or second substation LAN and the WAN, and
   a virtual IED defined in the second substation using the translated values of the message parameters, and adapted to impersonate emulating the first IED.

17. The apparatus according to claim 16, wherein the edge device comprises a filter adapted to select the relevant time-critical messages prior to translation of the message parameters.

18. The apparatus according to claim 17, wherein the edge device is adapted to perform the translation of the message parameters n times, where n is an integer that defines the number of substations to which the time-critical messages are sent via the WAN or that corresponds to the number of redundant pseudo wires via which the time-critical messages are received from the WAN.

19. The apparatus according to any one of claim 16, wherein the edge device is adapted to perform the translation of the message parameters n times, where n is an integer that defines the number of substations to which the time-critical messages are sent via the WAN or that corresponds to the number of redundant pseudo wires via which the time-critical messages are received from the WAN.

20. A system of transmitting time-critical messages in Open Systems Interconnection (OSI) layer 2 network tunnel from a first intelligent electronic device (IED) in a first substation to a second IED in a second substation over a Wide Area Network (WAN), wherein the first and second substation are associated with a first and second substation Local Area Network (LAN) respectively, wherein the system comprises:
   a first and second edge IED arranged in the first and second substation LAN respectively, and adapted to translate message parameters of the time-critical messages according to a translation table comprising corresponding translated values of message parameters for the first and/or second substation LAN and the WAN,
   a virtual IED defined in the second substation using the translated values of the message parameters, and adapted to impersonate the first IED in the first substation.

* * * * *